United States Patent [19]

Goda et al.

[11] Patent Number: 5,688,154
[45] Date of Patent: Nov. 18, 1997

[54] LIQUID INK COMPOSITION FOR IMPACT PRINTER AND INK RIBBON USING THE SAME

[75] Inventors: Hitoshi Goda; Masayuki Imanishi; Shota Yamada, all of Osaka, Japan

[73] Assignee: Fujicopian Co., Ltd., Japan

[21] Appl. No.: 438,651

[22] Filed: May 9, 1995

[30] Foreign Application Priority Data

May 10, 1994 [JP] Japan ................................ 6-096499

[51] Int. Cl.$^6$ .................................................. B41M 5/03
[52] U.S. Cl. ........................ 442/59; 428/195; 428/321.3; 428/914
[58] Field of Search ...................... 106/22 R, 22 D, 106/22 E; 428/195, 207, 321.3, 914; 442/59

[56] References Cited

U.S. PATENT DOCUMENTS

| | | |
|---|---|---|
| 3,086,872 | 4/1963 | Locke . |
| 4,079,026 | 3/1978 | Mone . |
| 5,017,228 | 5/1991 | Goda ........................ 106/28 |

FOREIGN PATENT DOCUMENTS

| | | | |
|---|---|---|---|
| 289 897 | 5/1991 | German Dem. Rep. ........ C09D 11/06 |
| 62-28283 | 2/1987 | Japan ................................ B41J 31/00 |
| 5-262054 | 10/1993 | Japan ................................ B41J 31/02 |
| 7-305015 | 11/1995 | Japan ........................................ 428/195 |

OTHER PUBLICATIONS

Derwent Database abstract for JP A 62-28283.
Derwent Database abstract for JP A 5-262054.
Derwent Database abstract for DD A 289 897.

*Primary Examiner*—Bruce H. Hess
*Attorney, Agent, or Firm*—Fish & Neave

[57] ABSTRACT

A liquid ink composition for an impact printer, comprising a dye and an oily substance as an essential component, the dye being insoluble in the oily substance and dispersed in the oily substance. An ink ribbon for an impact printer using the liquid ink composition is also disclosed. The use of the liquid ink composition reduces wear and corrosion of the printing wires used in a wire dot printer and gives print images with no blurring.

3 Claims, No Drawings

LIQUID INK COMPOSITION FOR IMPACT PRINTER AND INK RIBBON USING THE SAME

BACKGROUND OF THE INVENTION

The present invention relates to a liquid ink composition for an ink ribbon suitably used in impact printers such as a wire dot printer and an ink ribbon using the liquid ink composition.

Recently impact printers such as the so-called wire dot printer wherein printing is performed by striking printing wires against an ink ribbon have been commonly used as a printing device for computers, word processors, and the like.

Conventionally used liquid inks for ink ribbons used in impact printers include one wherein a dye is uniformly dissolved in an oil component such as a higher fatty acid, an animal or vegetable oil or a surface active agent, and another wherein an organic or inorganic pigment is dispersed in the oil component and a dye is dissolved therein.

In recent years, the use of optical character readers (OCR) and bar code readers has widely spread due to advanced rationalization of office management and physical distribution management. In connection with this and other factors, it has been required that the aforesaid ink for ink ribbons gives print images which, of course, have a density in visual region (hereinafter referred to as "visual density") and also a sufficient density relative to light rays in the near infrared region in the vicinity of 900 nm from semiconductor lasers or the like used in these reading devices.

In response to such demand, carbon black has been used as an extremely useful coloring agent. However, an ink containing carbon black has a drawback that, in particular, when the ink is used for a wire dot printer, it markedly wears the printing wire thereof. This wearing of printing wire has become a great problem, in particular, under the present conditions that high speed printing and high quality of print images are demanded for the impact printer and, hence, it is necessary to extremely reduce the diameter of dots.

From the viewpoint of reducing the wearing, the above-mentioned dye-type ink wherein an oil-soluble dye is dissolved in an oily substance is desirable. However, since oil-soluble dyes, generally, have little absoption power to light rays in near infrared region, the dye-type ink is not adaptable to OCR device and the like. Among these dye-type inks, one using a dye treated with a fatty acid such as oleic acid involves a problem that the printing wire is corroded due to the acid group of the fatty acid, although the degree of corrosion varies depending upon the material of the printing wire. Further, the dye-type ink involves a problem in which the ink gives blurred print images.

Japanese Unexamined Patent Publication No. 251578/1990 proposes an oily ink wherein a material absorbing near infrared rays is added. However, such material is generally expensive and print images obtained from this ink are insufficient in the visual density, so that the ink is limited in use.

Japanese Unexamined Patent Publication No. 246083/1986 discloses an ink ribbon wherein an organic pigment which less wears the printing wire is used. However, these organic pigments, generally, have small absorption power to near infrared rays, and this ink has limited use in reading with OCR devices and the like.

Japanese Unexamined Patent Publication No. 170481/1988 discloses an attempt to reduce the wearing of the printing wire by using carbon black having a particle size of lower than a specific value. However, such carbon black having a small particle size has an extremely large surface area and, hence, it is very difficult to disperse the carbon black. Even if the carbon black can be dispersed, the viscosity of the resulting ink is increased and, as a result, it is difficult to prepare an ink composition having a good flowability. Further, there are problems that even though carbon black having a minute particle size is specially used, the particles thereof are again agglomerated on storage due to unstable dispersion, so that print images having a desired density are not obtained and the wear of the printing wire is accelerated by the agglomerated carbon black particles. Thus, the ink does not exhibit desired effect and is of no practical use.

On the other hand, as a technology for improving dispersibility of pigments, there have been proposed a variety of pigment dispersing agents. Some of the dispersing agents are put to practical use in the field of usual printing inks. For example, Japanese Examined Patent Publication No. 34009/1979 proposes polyester oligomers prepared by dehydration-condensation of hydroxycarboxylic acids. British Patent No. 1,373,660 proposes compounds prepared by amidation of the aforesaid polyester oligomer with an amine compound. Further, U.S. Pat. No. 4,224,212 describes compounds prepared by bonding the polyester oligomer to a polyalkyleneimine.

However, problems arose the use of these conventional pigment dispersing agents as a dispersing agent for the aforesaid carbon black having a minute particle size which is the coloring agent of an ink for an ink ribbon used in an impact printer. For example, the polyester oligomers or the amidated compounds thereof are poor in ability of dispersing the minute carbon black. Also, quaternary salts of these compounds corrode the printing wire in addition to the wearing thereof. Furthermore, the dispersing agents described in U.S. Pat. No. 4,224,212 increases the viscosity of the resulting dispersion higher than that required due to the extremely high molecular weight of the polyalkyleneimine used, resulting in failure to obtain an ink having desired flowability.

In view of the above-mentioned problems involved in the prior art, it is an object of the present invention to provide a liquid ink composition for an impact printer which reduces wear and corrosion of printing members of impact printers such as the printing wire of a wire dot printer and gives print images with no blurring, and an ink ribbon using the liquid ink composition.

Another object of the present invention is to provide a liquid ink composition for an impact printer providing both of a sufficient visual density and adaptability to reading devices such as OCR devices.

These and other objects of the present invention will become apparent from the description hereinafter.

SUMMARY OF THE INVENTION

The present invention provides a liquid ink composition for an impact printer, comprising a dye and an oily substance as an essential component, the dye being insoluble in the oily substance and dispersed in the oily substance.

According to an embodiment of the liquid ink composition, the dye is nigrosine dye.

The present invention further provides an ink ribbon for an impact printer, comprising a fabric ribbon substrate and a liquid ink composition contained in the fabric ribbon substrate, the liquid ink composition comprising a dye and an oily substance as an essential component, the dye being insoluble in the oily substance and dispersed in the oily substance.

According to an embodiment of the ink ribbon, the dye is nigrosine dye.

DETAILED DESCRIPTION

The present inventors have found that an ink wherein a dye is stably dispersed in a state of minute particles in an oily substance reduces wear and corrosion of the printing members of impact printers such as printing wire of a wire dot printer and gives print images with no blurring, and an ink especially using nigrosine dye as the dye gives print images having a sufficient density to even light rays in near infrared region, providing good adaptability to reading devices such as OCR devices. The present invention has been completed on the basis of these findings.

The liquid ink composition for impact printers in accordance with the present invention contains a dye dispersed in an oily substance which does not dissolve the dye. The dye is used in the form of being dispersed in the oily substance without being dissolved, thereby preventing print images from blurring.

Since the ink composition of the present invention does not contain any fatty acid such as oleic acid, despite being an ink containing a dye, it does not cause the problem that a printing member, such as a printing wire is corroded due to the acidic group of the fatty acid. Further, particles of dyes such as nigrosine dye are more soft than particles of pigments and, hence, the wearing of printing members such as printing wire is markedly reduced.

Usable as the dye in the present invention are a variety of dyes, including nigrosine and oil black.

When nigrosine dye is especially used as the dye in the ink composition of the present invention, the resulting ink gives print images having good readability on an OCR device or the like because nigrosine dye absorbs near infrared rays despite being a dye.

Usable as the oily substance which does not dissolve the foregoing dyes are oily substances having a small polarity, including paraffin oil, polybutene, and diester oils such as dioctyl azelate and dioctyl sebacate. These oily substances may be used alone or in combination.

A dispersing agent is preferably used in order to stably disperse the dye in the form of minute particles in the oily substance. Usable as such a dispersing agent are the usual dispersing agents for pigments without no particular limitation, unless the main purpose of using the dispersing agent is to dissolve the dye. Examples of the dispersing agent are polyester type dispersing agents, lecitin and non-ionic surface active agents. These dispersing agents may be used alone or in combination.

The ink composition of the present invention preferably contains the aforesaid components in amounts mentioned below on the basis of the total amount of the ink composition.

| Component | % by weight |
|---|---|
| Dye | 5 to 50 |
| Dye dispersing agent | 5 to 50 |
| Oily substance | 10 to 90 |

When the content of the dye is lower than the above range, the resulting ink is poor in visual density. In the case of using nigrosine dye, when the content of nigrosine dye is lower than the above range, the resulting ink is poor in readability on reading devices such as OCR devices. When the content of the dye is higher than the above range, the resulting ink does not have proper flowability. When the content of the dispersing agent is lower than the above range, the dye is not favorably dispersed. When the content of the dispersing agent is higher than the above range, problems such as agglomeration of dispersed dye particles and excess increase in ink viscosity are prone to occur, resulting in failure to obtain an ink having the desired flowability. When the content of the oily substance is lower than the above range, the resulting ink does not have proper flowability. When the content of the oily substance is higher than the above range, the proportion of the dye becomes too small, resulting in low visual density and poor readability on OCR device or the like.

From the viewpoint of proper flowability, the ink composition of the present invention preferably has a viscosity (measured at 25° C., hereinafter the same) of 100 to 4,000 cps.

The ink composition of the present invention can be further incorporated with a pigment, a resin, or an additive such as a preservative or antifungal agent unless the object of the present invention is injured.

The ink composition of the present invention can be prepared by kneading the foregoing components with a roll mill, a sand mill or the like.

Suitably usable as a fabric ribbon substrate to be impregnated with the ink composition are woven fabrics made of fibers of nylon 6, nylon 66, polyester, silk, cotton or the like. The substrate preferably has a basis weight of about 30 to 80 g/m$^2$. The amount of the ink composition contained in the substrate is preferably from about 5 to 25 g/m$^2$.

The present invention will be more fully described by way of Examples. It is to be understood that the present invention is not limited to the Examples, and various changes and modifications may be made in the invention without departing from the spirit and scope thereof.

EXAMPLES 1 TO 4 AND COMPARATIVE EXAMPLES 1 TO 3

According to each formula shown in Table 1, components were mixed and kneaded by means of 3-roll mill to prepare an ink In each ink of Examples 1 to 4, the dye was dispersed without being dissolved. In the ink of Comparative Example 1, the dye was dissolved and carbon black was dispersed. In each ink of Comparative Examples 2 and 3, the dye was dissolved.

The viscosity of each of the thus obtained inks was measured and the corrosiveness of each ink to a printing wire was evaluated.

A nylon fabric having a width of 13 mm and a basis weight of 65 g/m$^2$ was impregnated with each ink an amount of 15 g/m$^2$, from which a Möbius strip having a length of 60 meters was produced. The ink ribbon in the form of Möbius strip was contained in a ribbon cassette. With use of a 24-pin wire dot printer (printing wire: high speed steel, diameter: 0.2 mm) loaded with the ribbon cassete, printing was conducted to measure the amount of wear of the printing wire and the density of print images and to evaluate the readability of the print images on an OCR device.

The methods of the foregoing tests are as follows. The results thereof are shown in Table 1.

(1) Ink viscosity

The ink viscosity was measured with a viscometer, Rotovisco made by Haake Co., Ltd.

(2) Density of print image

With use of the above-mentioned wire dot printer, printing was conducted on a white continuous paper sheet for business form and the density (PCS value) of the obtained images was measured with a densitometer, PCM-II made by Macbeth using "A" filter (visible range) or "B" filter (near infrared range).

(3) OCR adaptability

The OCR adaptability was evaluated on the basis of the density of the print images measured with use of "B" filter (near infrared range).

2: Good

1: Poor (4) Blurring of print image

The blurring of print image was observed by the naked eye.

2: No blurring was observed.
1: Blurring was observed.

(5) Amount of wear of printing wire

With use of the above-mentioned wire dot printer, $10^8$ dots were printed and thereafter the amount ($\mu$m) of wear of the printing wire was measured.

(6) Corrosiveness of ink

The printing wire of the above-mentioned wire dot printer was immersed in each ink at 85° C. for 72 hours. The surface of the printing wire was observed with an electron microscope (magnification: ×350) to evaluate the corrosiveness of each ink.

3: No corrosion was observed.
2: Slight corrosion was observed.
1: Serious corrosion was observed.

TABLE 1

|  | Ex. 1 | Ex. 2 | Ex. 3 | Ex. 4 | Com. Ex. 1 | Com. Ex. 2 | Com. Ex. 3 |
|---|---|---|---|---|---|---|---|
| Ink formula (% by weight) | | | | | | | |
| Nigrosine dye | 10 | 20 | 40 | | 15 | 20 | |
| Oil Black HBB (C.I. Solvent Black 3) | | | | 20 | | | 20 |
| Carbon black | | | | | 10 | | |
| Polyester dispersing agent | 10 | 20 | 30 | 20 | | | |
| Paraffin oil | 80 | 60 | 30 | 60 | 35 | 40 | 30 |
| Oleic acid | | | | | 30 | 40 | |
| Sorbitan surface active agent | | | | | 10 | | 50 |
| Ink viscosity (cps/25° C.) | 200 | 1,500 | 3,000 | 1,500 | 1,500 | 1,500 | 2,000 |
| Evaluation | | | | | | | |
| Blurring of print image | 2 | 2 | 2 | 2 | 2 | 1 | 1 |
| Amount of wear of wire ($\mu$m/$10^8$ dots) | 4 | 5 | 10 | 5 | 100 | 5 | 5 |
| Corrosion of wire | 3 | 3 | 3 | 3 | 1 | 1 | 3 |
| Print image density (PCS) | | | | | | | |
| A filter (visible range) | 0.7 | 0.8 | 0.85 | 0.8 | 0.8 | 0.8 | 0.8 |
| B filter (near infrared range) | 0.6 | 0.7 | 0.75 | 0.4 | 0.7 | 0.7 | 0.4 |
| OCR adaptability | 2 | 2 | 2 | 1 | 2 | 2 | 1 |

The use of the ink composition of the present invention reduces wear and corrosion of printing members of impact printers such as the printing wire of a wire dot printer, and gives print images with no blurring. The use of an ink composition especially using nigrosine dye as the dye gives print images which have sufficient visual density and can favorably be read with a reading device such as OCR device.

In addition to the materials and ingredients used in the Examples, other materials and ingredients can be used in the Examples as set forth in the specification to obtain substantially the same results.

What is claimed is:

1. An ink ribbon for an impact printer, comprising a fabric ribbon substrate and a liquid ink composition contained in the fabric ribbon substrate, the liquid ink composition comprising a coloring agent and an oily substance having a small polarity as an essential component, the coloring agent consisting essentially of a dye, the dye being insoluble in the oily substance and dispersed in the oily substance.

2. The ink ribbon of claim 1, wherein the oily substance is selected from the group consisting of paraffin oil, polybutene, diester oil and combinations thereof.

3. The ink ribbon of claim 1 or 2, wherein the dye is nigrosine dye.

* * * * *